US010114767B2

(12) United States Patent
Bennett et al.

(10) Patent No.: US 10,114,767 B2
(45) Date of Patent: *Oct. 30, 2018

(54) VIRTUALIZING PHYSICAL MEMORY IN A VIRTUAL MACHINE SYSTEM USING A HIERARCHY OF EXTENDED PAGE TABLES TO TRANSLATE GUEST-PHYSICAL ADDRESSES TO HOST-PHYSICAL ADDRESSES

(71) Applicant: Intel Corporation, Santa Clara, CA (US)

(72) Inventors: Steven M. Bennett, Hillsboro, OR (US); Andrew V. Anderson, Forest Grove, OR (US); Gilbert Neiger, Hillsboro, OR (US); Rajesh Sankaran Madukkarumukumana, Portland, OR (US); Richard UhligQ, Hillsboro, OR (US); Lawrence Smith, III, Beaverton, OR (US); Scott D. Rodgers, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/837,822

(22) Filed: Mar. 15, 2013

(65) Prior Publication Data
US 2013/0219143 A1 Aug. 22, 2013

Related U.S. Application Data

(63) Continuation of application No. 13/714,457, filed on Dec. 14, 2012, now Pat. No. 8,645,665, which is a (Continued)

(51) Int. Cl.
*G06F 12/10* (2016.01)
*G06F 12/14* (2006.01)
(Continued)

(52) U.S. Cl.
CPC ...... *G06F 12/1483* (2013.01); *G06F 9/45533* (2013.01); *G06F 9/45558* (2013.01);
(Continued)

(58) Field of Classification Search
CPC ............... G06F 12/109; G06F 12/1036; G06F 12/1009; G06F 9/45558;
(Continued)

(56) References Cited

U.S. PATENT DOCUMENTS 4,430,705 A * 2/1984 Cannavino et al. .......... 711/206
4,456,954 A * 6/1984 Bullions et al. .............. 711/207
(Continued)

FOREIGN PATENT DOCUMENTS

| EP | 1426868 A2 | 6/2004 |
|---|---|---|
| JP | 57-212680 A | 12/1982 |

(Continued)

OTHER PUBLICATIONS

Office Action received for Japanese Patent Application No. 2006-006606, dated Mar. 1, 2011, 4 pages of English Translation and 4 pages of Office Action.
(Continued)

*Primary Examiner* — Hong C Kim
(74) *Attorney, Agent, or Firm* — Nicholson De Vos; Webster & Elliott LLP

(57) ABSTRACT

A processor including a virtualization system of the processor with a memory virtualization support system to map a reference to guest-physical memory made by guest software executable on a virtual machine which in turn is executable on a host machine in which the processor is operable to a reference to host-physical memory of the host machine.

1 Claim, 9 Drawing Sheets

Related U.S. Application Data continuation of application No. 12/971,911, filed on Dec. 17, 2010, now Pat. No. 8,533,428, which is a continuation of application No. 11/036,736, filed on Jan. 14, 2005, now Pat. No. 7,886,126.

(51) Int. Cl.
*G06F 9/455* (2018.01)
*G06F 12/109* (2016.01)

(52) U.S. Cl.
CPC .. *G06F 12/109* (2013.01); *G06F 2009/45583* (2013.01); *G06F 2212/151* (2013.01); *G06F 2212/152* (2013.01); *G06F 2212/657* (2013.01)

(58) Field of Classification Search
CPC ....... G06F 2009/45583; G06F 12/1027; G06F 9/45533; G06F 12/10; G06F 9/45545; G06F 12/1483; G06F 2212/657; G06F 2212/152; G06F 2212/151
USPC ............. 711/206, 203, 2, 6, 220; 718/1, 107
See application file for complete search history.

(56) References Cited

U.S. PATENT DOCUMENTS

| | | | |
|---|---|---|---|
| 4,792,897 A | 12/1988 | Gotou et al. | |
| 5,109,496 A | 4/1992 | Beausoleil et al. | |
| 5,426,751 A | 6/1995 | Sawamoto | |
| 5,675,762 A | 10/1997 | Bodin et al. | |
| 5,765,207 A | 6/1998 | Curran | |
| 6,304,944 B1* | 10/2001 | Pedneau | 711/139 |
| 6,393,544 B1 | 5/2002 | Bryg et al. | |
| 6,651,132 B1* | 11/2003 | Traut | 711/206 |
| 6,671,791 B1* | 12/2003 | McGrath | 711/206 |
| 6,792,521 B2 | 9/2004 | Arimilli et al. | |
| 6,981,125 B2* | 12/2005 | Emmes | 711/207 |
| 7,111,145 B1* | 9/2006 | Chen et al. | 711/206 |
| 7,222,221 B1* | 5/2007 | Agesen | G06F 9/45537 707/999.2 |
| 7,409,487 B1 | 8/2008 | Chen et al. | |
| 7,886,126 B2* | 2/2011 | Bennett et al. | 711/206 |
| 2004/0003324 A1* | 1/2004 | Uhlig | G06F 11/0751 714/38.13 |
| 2004/0054518 A1 | 3/2004 | Altman et al. | |
| 2004/0064668 A1 | 4/2004 | Kjos et al. | |
| 2004/0078631 A1 | 4/2004 | Rogers et al. | |
| 2004/0117539 A1* | 6/2004 | Bennett | G06F 9/45558 711/6 |
| 2004/0117593 A1* | 6/2004 | Uhlig | G06F 12/1036 711/207 |
| 2005/0015378 A1* | 1/2005 | Gammel et al. | 707/100 |
| 2005/0076324 A1 | 4/2005 | Lowell et al. | |
| 2005/0081199 A1 | 4/2005 | Traut | |
| 2005/0091354 A1 | 4/2005 | Lowell et al. | |
| 2005/0240751 A1 | 10/2005 | Neiger et al. | |
| 2005/0273570 A1* | 12/2005 | DeSouter et al. | 711/203 |
| 2006/0005200 A1 | 1/2006 | Vega et al. | |
| 2006/0010440 A1* | 1/2006 | Anderson | G06F 9/45533 718/1 |
| 2006/0026383 A1 | 2/2006 | Dinechin et al. | |
| 2006/0026384 A1* | 2/2006 | Brandt | G06F 9/4843 711/209 |
| 2006/0075285 A1* | 4/2006 | Madukkarumukumana et al. | 714/5 |
| 2006/0139360 A1 | 6/2006 | Panesar et al. | |
| 2006/0150183 A1* | 7/2006 | Chinya | G06F 9/45533 718/100 |
| 2006/0206687 A1 | 9/2006 | Vega et al. | |
| 2006/0259734 A1* | 11/2006 | Sheu et al. | 711/203 |

FOREIGN PATENT DOCUMENTS

| | | |
|---|---|---|
| JP | 04-357540 A | 12/1992 |
| JP | 2001-056783 A | 2/2001 |
| JP | 2004-527044 A | 9/2004 |
| TW | 200307866 A | 12/2003 |
| TW | 200408935 A | 6/2004 |

OTHER PUBLICATIONS

Advanced Micro Devices, "AMD64 Virtualization Codenamed "Pacific" Technology", Secure Virtual Machine Architecture Reference Manual, May 2005, pp. 49-51.
IBM System/370 Extended Architecture, Interpretive Execution, Publication No. SA22-7095-1, File No. S370-01, Sep. 1985.
Office Action received for Chinese Patent Application No. 200610004027.3, dated May 9, 2008, 6 pages of English Translation.
Office Action received for Chinese Patent Application No. 200610004027.3, dated Aug. 17, 2007, 9 pages of English Translation and 6 pages of Office Action.
Office Action received for European Patent Application No. 06250089.7, dated Apr. 23, 2009, 3 pages of Office Action.
Office Action received for European Patent Application No. 06250089.7, dated Dec. 15, 2008, 3 pages of Office Action.
Office Action received for European Patent Application No. 10183511.4, dated Jan. 24, 2011, 2 pages of Office Action.
Extended European Search Report and Written Opinion for European Patent Application No. 10183511.4, dated Nov. 30, 2010, 4 pages of Extended European Search Report and Written Opinion.
Office Action received for Japanese Patent Application No. 2006-006606, dated Jul. 28, 2009, 2 pages of English Translation and 2 pages of Office Action.
Office Action received for Korean Patent Application No. 10-2006-0004080, dated Feb. 23, 2007, 2 pages of English Translation and 3 pages of Office Action.
Official Letter received for Taiwanese Patent Application No. 95100745, dated Jul. 30, 2008,1 page of English Translation and 4 pages of Official Letter.
Office Action Received for Chinese Patent Application No. 200910135462.3 dated Dec. 12, 2011, 3 page of Office Action and 5 pages of English Translation.
Office Action Received for Europe Patent Application No. 10183511.4 dated Oct. 17, 2011, 4 page of Office Action.
Office Action received for European Patent Application No. 06250089.7, dated Dec. 9, 2010, 4 pages of Office Action.
Office Action Received in European Application No. 06250089.7, dated Mar. 13, 2012, 4 pages.
Office Action Received in European Application No. 10183511.4, dated Mar. 13, 2012, 4 pages.
Office Action received in Japanese Patent Application No. 2010-053073, dated Aug. 28, 2012, 5 pages of Office Action, including 2 pages of English translation.
Office Action Received in European Application No. 10183511.4, dated Jan. 4, 2013, 5 pages of Office Action.
Office Action received in Japanese Patent Application No. 2011-266502, dated Sep. 3, 2013, 3 pages of Office Action and 2 pages of English translation.
Office Action received for European Patent Application No. 10183511.4, dated Jan. 5, 2015, 1 page of Office Action.
Office Action received for Japanese Patent Application No. 2014-145013, dated Jun. 23, 2015, 4 pages of Office Action and 5 pages of English Translation.
Kazuhide Takahashi, "Don't make, don't show, don't let them use: a new battle against security holes" NIKKEI BYTE, July Issue of 2004, Japan, Nikkei BP, Jun. 22, 2004, No. 254, pp. 38-43.
Extended Search Report received for EP Patent Application No. 15156582.7, dated Jan. 27, 2016, 7 pages.
Furht et al. "A Survey of Microprocessor Architectures for Memory Management", IEEE, vol. 20, Mar. 1, 1987, pp. 48-67.
Abandonment from U.S. Appl. No. 11/036,736, dated Oct. 14, 2010, 1 page.
Extended European Search Report for Application No. 06250089.7, dated May 4, 2006, 6 pages.
Final Office Action from U.S. Appl. No. 11/036,736, dated Jun. 24, 2009, 10 pages.

(56) References Cited

OTHER PUBLICATIONS

Final Office Action from U.S. Appl. No. 11/036,736, dated Oct. 12, 2007, 11 pages.
Final Office Action from U.S. Appl. No. 12/971,911, dated Jan. 10, 2012, 20 pages.
Non Final Office Action from U.S. Appl. No. 14/569,069, dated Jan. 8, 2015, 9 pages.
Non-Final Office Action from U.S. Appl. No. 11/036,736, dated Feb. 22, 2008, 8 pages.
Non-Final Office Action from U.S. Appl. No. 11/036,736, dated Mar. 15, 2007, 12 pages.
Non-Final Office Action from U.S. Appl. No. 11/036,736, dated Oct. 28, 2008, 11 pages.
Non-Final Office Action from U.S. Appl. No. 12/971,911, dated Apr. 26, 2011, 14 pages.
Non-Final Office Action from U.S. Appl. No. 12/971,911, dated Dec. 6, 2012, 19 pages.
Notice of Allowance from U.S. Appl. No. 11/036,736 , dated Jun. 29, 2010, 7 pages.
Notice of Allowance from U.S. Appl. No. 12/971,911, dated May 15, 2013, 10 pages.
Notice of Allowance from U.S. Appl. No. 13/714,457, dated Sep. 25, 2013, 11 pages.
Notice of Allowance from U.S. Appl. No. 14/569,069, dated Jun. 17, 2015, 19 pages.
Office Action from foreign counterpart Japanese Patent Application No. 2006-006606, dated Aug. 16, 2011, 28 pages.

\* cited by examiner

VIRTUALIZING PHYSICAL MEMORY IN A VIRTUAL MACHINE SYSTEM USING A HIERARCHY OF EXTENDED PAGE TABLES TO TRANSLATE GUEST-PHYSICAL ADDRESSES TO HOST-PHYSICAL ADDRESSES

RELATED APPLICATION

This application is a continuation of U.S. patent application Ser. No. 13/714,457, entitled "VIRTUALIZING PHYSICAL MEMORY IN A VIRTUAL MACHINE SYSTEM", filed Dec. 14, 2012 and issued on Feb. 4, 2014 as U.S. Pat. No. 8,645,665, which is a continuation of U.S. patent application Ser. No. 12/971,911, entitled "VIRTUALIZING PHYSICAL MEMORY IN A VIRTUAL MACHINE SYSTEM", filed Dec. 17, 2010 and issued on Sep. 10, 2013 as U.S. Pat. No. 8,533,428, which is a continuation of U.S. patent application Ser. No. 11/036,736, entitled "VIRTUALIZING PHYSICAL MEMORY IN A VIRTUAL MACHINE SYSTEM", filed Jan. 14, 2005 and issued on Feb. 8, 2011 as U.S. Pat. No. 7,886,126.

BACKGROUND

Virtualization enables a single host machine with hardware and software support for virtualization to present multiple abstractions of the host, such that the underlying hardware of the host machine appears as one or more independently operating virtual machines. Each virtual machine may therefore function as a self-contained platform. Often, virtualization technology is used to allow multiple guest operating systems and/or other guest software to coexist and execute apparently simultaneously and apparently independently on multiple virtual machines while actually physically executing on the same hardware platform. A virtual machine may mimic the hardware of the host machine or alternatively present a different hardware abstraction altogether.

Virtualization systems may include a virtual machine monitor (VMM) which controls the host machine. The VMM provides guest software operating in a virtual machine with a set of resources (e.g., processors, memory, IO devices). The VMM may map some or all of the components of a physical host machine into the virtual machine, and may create fully virtual components, emulated in software in the VMM, which are included in the virtual machine (e.g., virtual IO devices). The VMM may thus be said to provide a "virtual bare machine" interface to guest software. The VMM uses facilities in a hardware virtualization architecture to provide services to a virtual machine and to provide protection from and between multiple virtual machines executing on the host machine.

As guest software executes in a virtual machine, certain instructions executed by the guest software (e.g., instructions accessing peripheral devices) would normally directly access hardware, were the guest software executing directly on a hardware platform. In a virtualization system supported by a VMM, these instructions may cause a transition to the VMM, referred to herein as a virtual machine exit. The VMM handles these instructions in software in a manner suitable for the host machine hardware and host machine peripheral devices consistent with the virtual machines on which the guest software is executing. Similarly, certain interrupts and exceptions generated in the host machine may need to be intercepted and managed by the VMM or adapted for the guest software by the VMM before being passed on to the guest software for servicing. The VMM then transitions control to the guest software and the virtual machine resumes operation. The transition from the VMM to the guest software is referred to herein as a virtual machine Entry.

As is well known, a process executing on a machine on most operating systems may use a virtual address space, which is an abstraction of the underlying physical memory system. As is known in the art, the term virtual when used in the context of memory management e.g. "virtual address," "virtual address space," "virtual memory address" or "virtual memory space," refers to the well known technique of a processor based system, generally in conjunction with an operating system, presenting an abstraction of underlying physical memory to a process executing on a processor-based system. For example, a process may access a virtual, contiguous and linearized address space abstraction which is mapped to non-linear and non-contiguous physical memory by the underlying operating system. This use of virtual is distinguishable from the use of the same term used in the context virtualization, where virtual generally refers to an abstraction that simulates a physical machine e.g. "virtual machine," "virtual bare machine," "virtual hardware," "virtual processor" or "virtual network interface." The intended meaning of the term will be clear to one in the art based on the context in which it is used herein.

FIG. 1 shows a process executing on a processor-based system which incorporates a processor and a memory communicatively coupled to the processor by a bus. With reference to FIG. 1, when a process 105 references a memory location 110 in its virtual address space 115 (process virtual memory space), a reference to an actual address 140 in the physical memory 145 of the machine 125 (machine physical memory) is generated by memory management 130, which may be implemented in hardware (sometimes incorporated into the processor 120) and software (generally in the operating system of the machine). Memory management 130, among other functions maps a location in the virtual address space to a location in physical memory of the machine. As shown in FIG. 1, a process may have a different view of memory from the actual memory available in the physical machine. In the example depicted in FIG. 1, the process operates in a virtual address space from 0 to 1 MB which is actually mapped by the memory management hardware and software into a portion of the physical memory which itself has an address space from 10 to 11 MB; to compute a physical address from a process space address, an offset 135 may be added to the process virtual address. More complex mappings from process virtual memory space to physical memory are possible, for example, the physical memory corresponding to process virtual memory may be divided into parts such as pages and be interleaved with pages from other processes in physical memory.

Memory is customarily divided into pages, each page containing a known amount of data, varying across implementations, e.g. a page may contain 4096 bytes of memory. As memory locations are referenced by the executing process, they are translated into page references. In a typical machine, memory management maps a reference to a page in process virtual memory to a page in machine physical memory. In general, memory management may use a page table to specify the physical page location corresponding to a process space page location.

One aspect of managing guest software in a virtual machine environment is the management of memory. Handling memory management actions taken by the guest software executing in a virtual machine creates complexity for a controlling system such as a virtual machine monitor. Consider for example a system in which two virtual machines execute via virtualization on a host machine implemented on a 32-bit IA-32 Intel® Architecture platform (IA-32), which is described in the *IA-32 Intel® Architecture Software Developer's Manual* (IA-32 documentation). The IA-32 platform may include IA-32 page tables implemented as part of an IA-32 processor. Further, assume that each virtual machine itself presents an abstraction of an IA-32 machine to the guest software executing thereon. Guest software executing on each virtual machine may make references to a guest process virtual memory address, which in turn is translated by the guest machine's memory management system to a guest-physical memory address. However, guest-physical memory itself may be implemented by a further mapping in host-physical memory through a VMM and the virtualization subsystem in hardware on the host processor. Thus, references to guest memory by guest processes or the guest operating system, including for example references to guest IA-32 page table control registers, must then be intercepted by the VMM because they cannot be directly passed on to the host machine's IA-32 page table without further reprocessing, as the guest-physical memory does not, in fact, correspond directly to host-physical memory but is rather further remapped through the virtualization system of the host machine.

DETAILED DESCRIPTION

Figure 1:
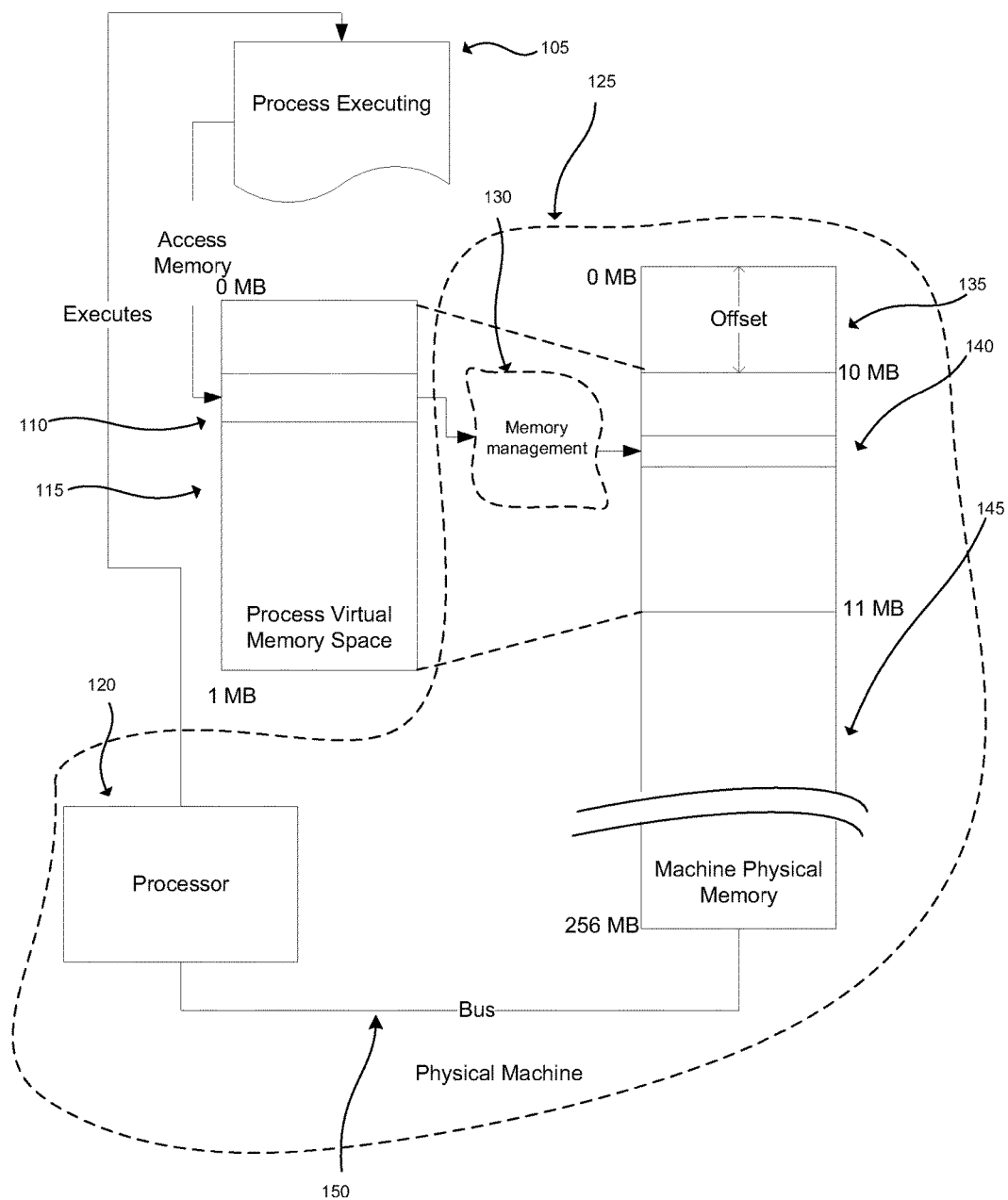
FIG. 1 depicts the relationship between process and physical memory (Prior Art).
Figure 2:
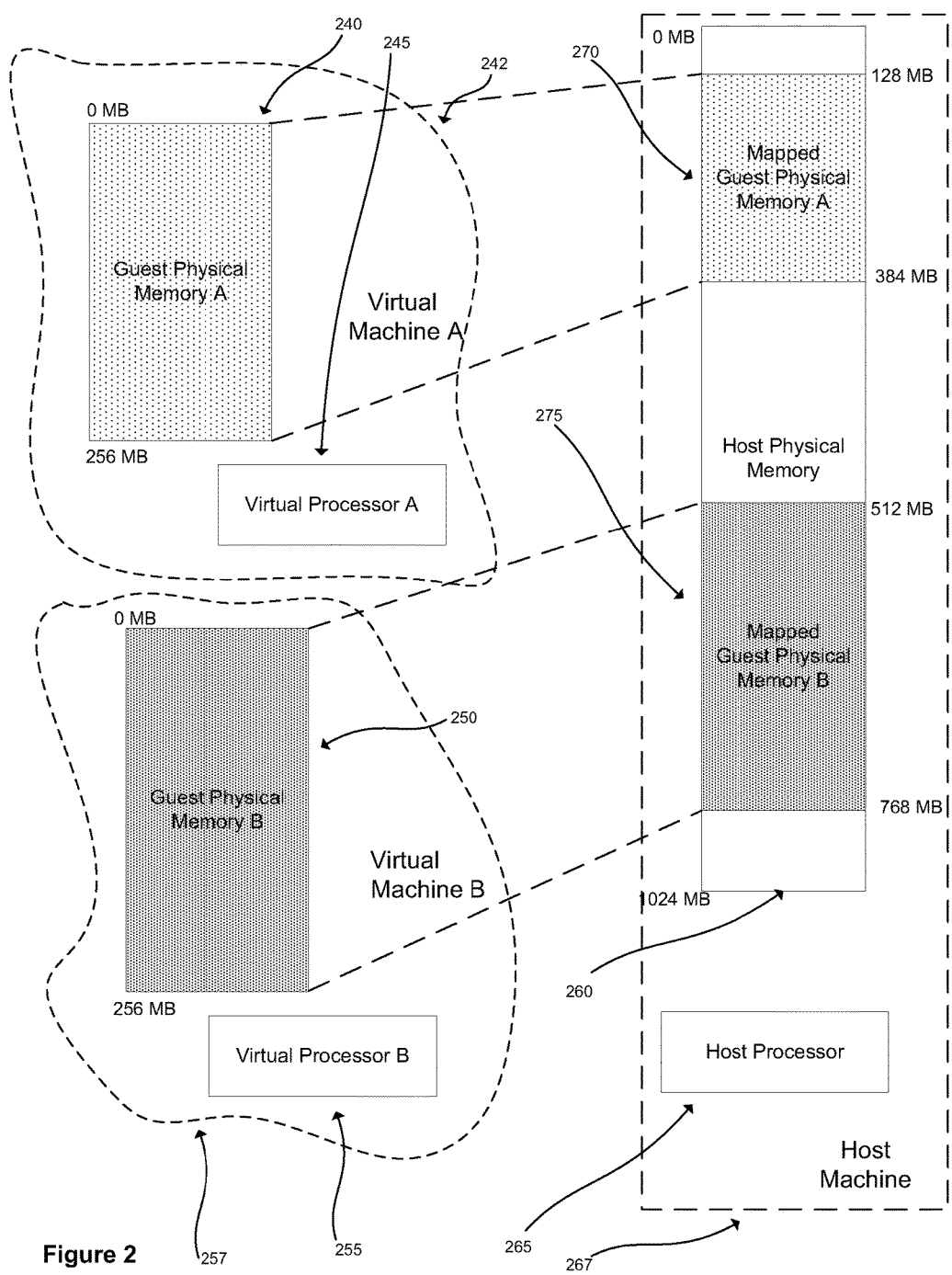
FIG. 2 depicts abstractly the relationship between virtual machines and a host machine in one embodiment.

FIG. 2: FIG. 2 depicts the relationship between one or more virtual machines executing on a host machine with specific regard to the mapping of guest memory in one embodiment. FIG. 2 illustrates how guest-physical memory is remapped through the virtualization system of the host machine. Each virtual machine such as virtual machine A, 242, and virtual machine B, 257, presents a virtual processor 245 and 255 respectively to guest software running on the virtual machines. Each machine provides an abstraction of physical memory to the guest operating system or other guest software, guest-physical memories 240 and 250, respectively. As guest software executes on the virtual machines 242 and 257, it is actually executed by the host machine 267 on host processor 265 utilizing host-physical memory 260.

As shown in FIG. 2, in this embodiment, guest-physical memory 240 which is presented as a physical memory space starting at address 0 in virtual machine A, 242, is mapped to some contiguous region 270 in host-physical memory 260. Similarly, guest-physical memory 250 in virtual machine B, 257, is mapped to a different portion 275 of host-physical memory 260. As shown in FIG. 2, the host machine might have 1024 MB of host-physical memory. If each virtual machine 242 and 257 is assigned 256 MB of memory, one possible mapping might be that virtual machine A, 242, is assigned the range 128-384 MB and virtual machine B, 257, is assigned the range 512-768 MB. Both virtual machines 242 and 257 reference a guest-physical address space of 0-256 MB. Only the VMM is aware that each virtual machine's address space maps to different portions of the host-physical address space.

The virtual machines and memory mapping shown in FIG. 2 are only one representation of one embodiment, in other embodiments, the actual number of virtual machines executing on a host machine may vary from one to many; the actual memory sizes of the host machine and the virtual machines may vary and be variable from virtual machine to virtual machine. The example depicts a simple, contiguous allocation of memory to virtual machines. In a more general case, the physical-memory pages allocated to a virtual machine may not be contiguous and might be distributed in the host-physical memory interleaved with each other and with pages belonging to the VMM and to other host processes.

A processor-based system that is presented as a virtual machine in a system such as that depicted in FIG. 2 may implement a virtual machine in all its complexity. Thus for example, a virtual machine may present a full view of guest-physical memory to the guest OS, and perform memory management for guest software executing on the virtual machine, using memory management provided by the guest OS and the virtual processor or other virtual hardware of the virtual machine. In one exemplary embodiment, the virtual machine may present an IA-32 platform including IA-32 hardware support such as page tables for memory management to the guest OS, and in turn be actually executing on a host platform which is also an IA-32 platform including IA-32 hardware for memory management. Without additional mechanisms, a virtualization system in this embodiment must implement a physical-memory virtualization algorithm in the VMM using, as one possible solution, IA-32 page table shadowing to remap, partition and protect physical memory. Thus, for example, when guest software attempts to access the IA-32 page tables of the virtual machine, the VMM must overlay functionality required for virtualization (e.g., remapping physical addresses) onto the functionality required by the guest OS.

To this end, the VMM must trap a variety of events surrounding the use of the paging mechanism by the guest software. This includes writes to control registers such as control registers of the IA-32 memory management system (e.g., CR0, CR3 and C4), accesses to model-specific registers (MSRs) associated with paging and memory access (e.g., memory-type range registers (MTRRs)), handling certain exceptions (e.g., page faults), as described in the IA-32 documentation. This use of the IA-32 page tables to virtualize physical memory is complex and exacts a significant performance overhead.

Figure 3:
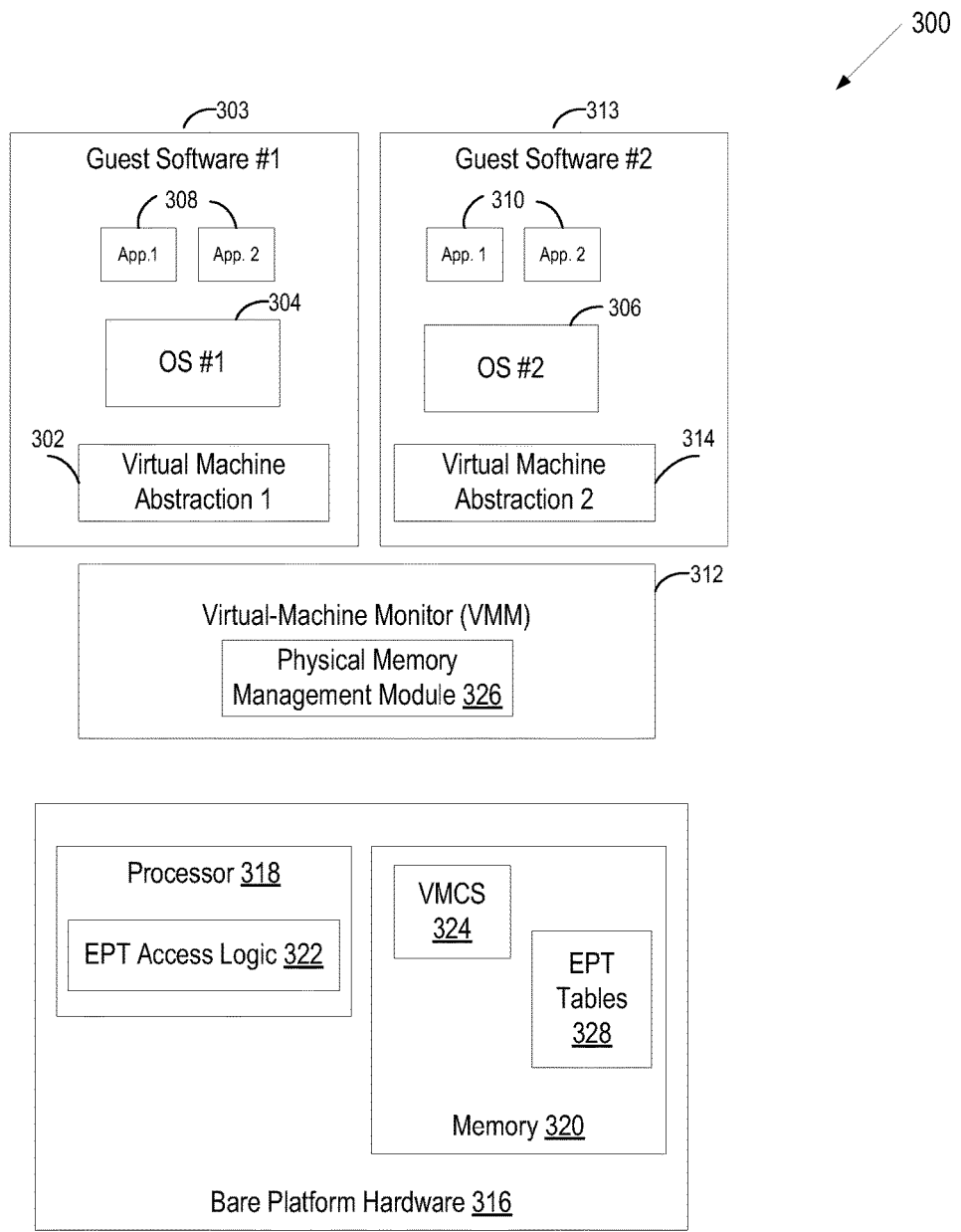
FIG. 3 depicts a high level structure of a virtual machine environment in one embodiment.

FIG. 3: FIG. 3 illustrates one embodiment of a virtual-machine environment 300. In this embodiment, a processor-based platform 316 may execute a VMM 312. The VMM, though typically implemented in software, may emulate and export a virtual bare machine interface to higher level software. Such higher level software may comprise a standard OS, a real time OS, or may be a stripped-down environment with limited operating system functionality and may not include OS facilities typically available in a standard OS in some embodiments. Alternatively, for example, the VMM 312 may be run within, or using the services of, another VMM. VMMs may be implemented, for example, in hardware, software, firmware or by a combination of various techniques in some embodiments.

The platform hardware 316 may be a personal computer (PC), mainframe, handheld device such as a personal digital assistant (PDA) or "smart" mobile phone, portable computer, set top box, or another processor-based system. The platform hardware 316 includes at least a processor 318 and memory 320. Processor 318 may be any type of processor capable of executing programs, such as a microprocessor, digital signal processor, microcontroller, or the like. The processor may include microcode, programmable logic or hard coded logic for execution in embodiments. Although FIG. 3 shows only one such processor 318, there may be one or more processors in the system in an embodiment. Additionally, processor 318 may include multiple cores, support for multiple threads, or the like. Memory 320 can comprise a hard disk, a floppy disk, random access memory (RAM), read only memory (ROM), flash memory, any combination of the above devices, or any other type of machine medium readable by processor 318 in various embodiments. Memory 320 may store instructions and/or data for performing program execution and other method embodiments.

The VMM 312 presents to guest software an abstraction of one or more virtual machines, which may provide the same or different abstractions to the various guests. FIG. 3 shows two virtual machines, 302 and 314. Guest software such as guest software 303 and 313 running on each virtual machine may include a guest OS such as a guest OS 304 or 306 and various guest software applications 308 and 310. Guest software 303 and 313 may access physical resources (e.g., processor registers, memory and I/O devices) within the virtual machines on which the guest software 303 and 313 is running and to perform other functions. For example, the guest software 303 and 313 expects to have access to all registers, caches, structures, I/O devices, memory and the like, according to the architecture of the processor and platform presented in the virtual machine 302 and 314.

In one embodiment, the processor 318 controls the operation of the virtual machines 302 and 314 in accordance with data stored in a virtual machine control structure (VMCS) 324. The VMCS 324 is a structure that may contain state of guest software 303 and 313, state of the VMM 312, execution control information indicating how the VMM 312 wishes to control operation of guest software 303 and 313, information controlling transitions between the VMM 312 and a virtual machine, etc. The processor 318 reads information from the VMCS 324 to determine the execution environment of the virtual machine and to constrain its behavior. In one embodiment, the VMCS 324 is stored in memory 320. In some embodiments, multiple VMCS structures are used to support multiple virtual machines.

The VMM 312 may need to manage the physical memory accessible by guest software running in the virtual machines 302 and 314. To support physical memory management in one embodiment, the processor 318 provides an extended page table (EPT) mechanism. In the embodiment, the VMM 312 may include a physical memory management module 326 that provides values for fields associated with physical memory virtualization that may need to be provided before transition of control to the virtual machine 302 or 314. These fields are collectively referred to as EPT controls. EPT controls may include, for example, an EPT enable indicator specifying whether the EPT mechanism should be enabled and one or more EPT table configuration controls indicating the form and semantics of the physical memory virtualization mechanism. These will be discussed in detail below. Additionally, in one embodiment, EPT tables 328 indicate the physical address translation and protection semantics which the VMM 312 may place on guest software 303 and 313.

In one embodiment, the EPT controls are stored in the VMCS 324. Alternatively, the EPT controls may reside in a processor 318, a combination of the memory 320 and the processor 318, or in any other storage location or locations. In one embodiment, separate EPT controls are maintained for each of the virtual machines 302 and 314. Alternatively, the same EPT controls are maintained for both virtual machines and are updated by the VMM 312 before each virtual machine entry.

In one embodiment, the EPT tables 328 are stored in memory 320. Alternatively, the EPT tables 328 may reside in the processor 318, a combination of the memory 320 and the processor 318, or in any other storage location or locations. In one embodiment, separate EPT tables 328 are maintained for each of the virtual machines 302 and 314. Alternatively, the same EPT tables 328 are maintained for both virtual machines 302 and 314 and are updated by the VMM 312 before each virtual machine entry.

In one embodiment, the processor 318 includes EPT access logic 322 that is responsible for determining whether the EPT mechanism is enabled based on the EPT enable indicator. If the EPT mechanism is enabled, the processor translates guest-physical addresses to host-physical addresses-based on the EPT controls and EPT tables 328.

In one embodiment, in which the system 300 includes multiple processors or multi-threaded processors, each of the logical processors is associated with a separate EPT access logic 322, and the VMM 312 configures the EPT tables 328 and EPT controls for each of the logical processors.

Resources that can be accessed by guest software (e.g., 303, including guest OS 304 and application 308) may either be classified as "privileged" or "non-privileged." For privileged resources, the VMM 312 facilitates functionality desired by guest software while retaining ultimate control over these privileged resources. Further, each guest software 303 and 313 expects to handle various platform events such as exceptions (e.g., page faults, general protection faults, etc.), interrupts (e.g., hardware interrupts, software interrupts), and platform events (e.g., initialization (INIT) and system management interrupts (SMIs)). Some of these platform events are "privileged" because they must be handled by the VMM 312 to ensure proper operation of virtual machines 302 and 314 and for protection from and among guest software. Both guest operating system and guest applications may attempt to access privileged resources and both may cause or experience privileged events. Privileged platform events and access attempts to privileged resources are collectively referred to as "privileged events' or 'virtualization events" herein.

Figure 4A:
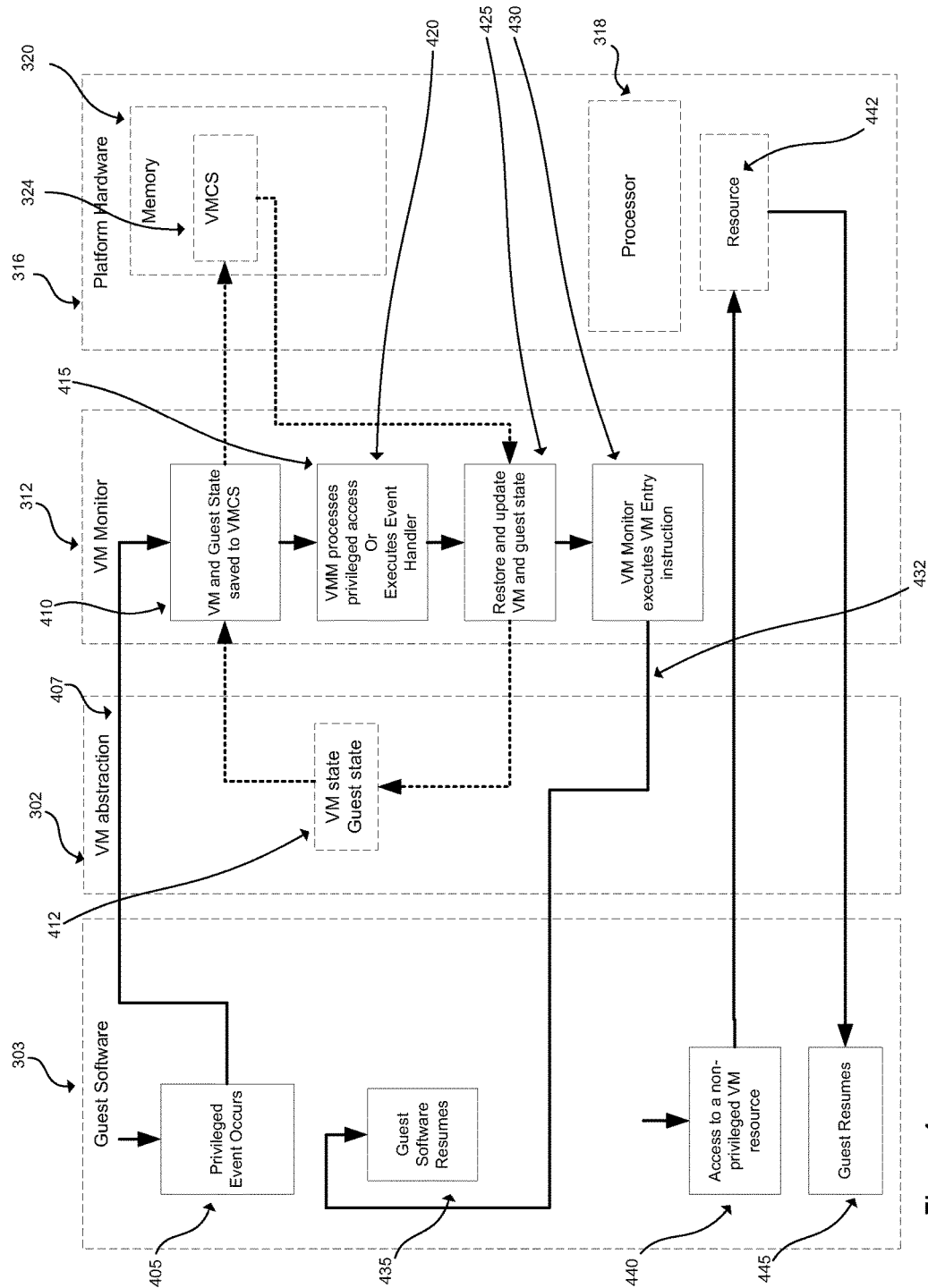
FIGS. 4a and 4b illustrate processing in one embodiment of a virtual machine environment.
Figure 4B:
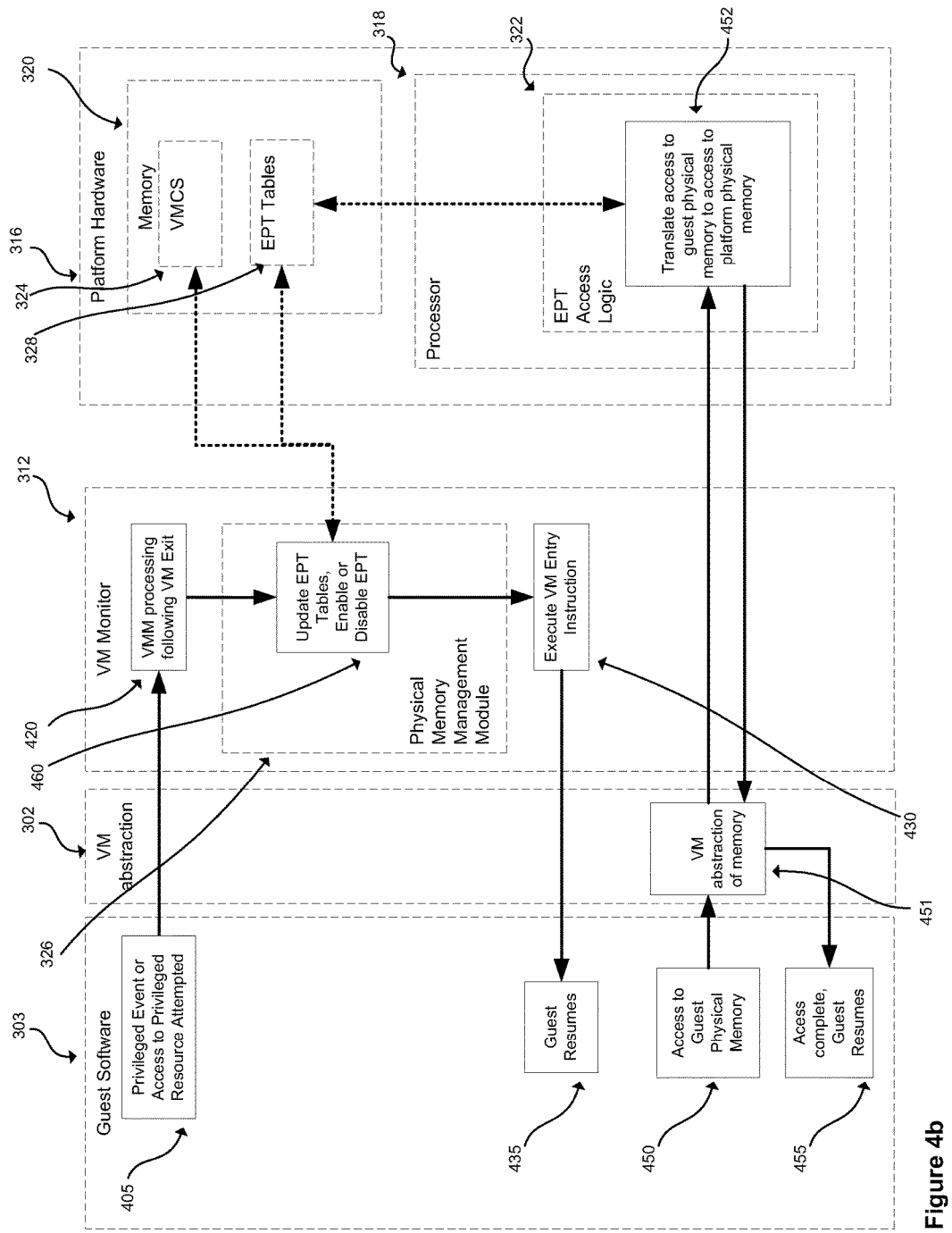

FIGS. 4a and 4b: Operation of a virtual machine environment in an embodiment such as that previously described and depicted in FIG. 3 is depicted by processing shown in FIGS. 4a and 4b. FIG. 4a depicts the operation of a VM environment in an embodiment to process a privileged event occurring in guest software; and the operation of the embodiment to process a non-privileged event by guest software. FIG. 4b depicts operations of a VM environment in an embodiment specifically related to extended paging tables, specifically relating to guest software access to guest-physical memory and to the management of the EPT mechanism in hardware by the VMM in the embodiment. FIGS. 4a and 4b do not depict all components or all operations that may occur in an environment such as that depicted in FIG. 3. This is solely for clarity of presentation. While a small set of components and a few specific operations are represented in FIGS. 4a and 4b, a VM environment in an embodiment may comprise many other components, and many other operations may take place in such an embodiment.

FIG. 4a is considered first. FIG. 4a depicts one exemplary set of operations of guest software 303 executing on a virtual machine abstraction 302, and platform hardware 316 previously described in FIG. 3. The operations are depicted within blocks indicating where in the system (e.g. in the VMM 312, in the guest software 303, etc.) they occur. In addition to other components of the VM environment previously described, VM abstraction 302 may store a virtual machine state and other state information for the guest software 303 at 412 and may also provide other resources such as a virtual network connection or set of general registers, to name two of many examples, to guests. Of course, the physical resources that implement VM state, guest state, and other VM resources are actually provided by the platform hardware 316 on which the VM executes. The platform hardware includes memory 320, VMCS 324 and processor 318.

At 440, guest software 303 accesses a non-privileged resource 442. Non-privileged resources do not need to be controlled by the VMM 312 and can be accessed directly by guest software which continues without invoking the VMM 312, allowing the guest to continue operation at 445 after accessing the non-privileged resource 442. A non-privileged platform event would likewise be handled without the intervention of the VMM 312 (this is not shown in FIG. 4a).

At 405, the guest software 303 attempts to access a privileged resource, and/or experiences a privileged platform event. When such a privileged event occurs as at 405, control may be transferred 407 to the VMM 312. The transfer of control 407 from guest software to the VMM 312 is referred to herein as a virtual machine exit. After facilitating the resource access or otherwise handling the privileged event appropriately, the VMM 312 may return control to guest software as at 432 which then resumes operation, 435. The transfer of control 432 from the VMM 312 to guest software is referred to as a virtual machine entry. In one embodiment, the VMM 312 initiates a virtual machine entry by executing an instruction specially designed to trigger the transition, 430, referred to herein as a virtual machine entry instruction.

In one embodiment, when a virtual machine exit occurs, components of the processor state used by guest software are saved, 410, components of the processor state required by the VMM 312 are loaded, and the execution resumes in the VMM 312 at 420. In one embodiment, the components of the processor state used by guest software are stored in a guest-state area of VMCS 324 and the components of the processor state required by the VMM 312 are stored in a monitor-state area of VMCS 324. In one embodiment, when a transition from the VMM 312 to guest software occurs, components of the processor state that were saved at the virtual machine exit (and may have been modified by the VMM 312 while processing the virtual machine exit) are restored 425 and control is returned to the virtual machine 302 or 314 at 430.

Next, FIG. 4b is considered. As noted previously, FIG. 4b depicts those operations of the VM environment described above and depicted in FIG. 4a specifically related to extended paging tables, to guest program access to guest-physical memory and to the management of the EPT mechanism in hardware by the VMM in one embodiment. As before, for clarity of presentation FIG. 4b does not depict all components or all operations that may occur in a VM environment in an embodiment. While a small set of components and a few specific operations are represented in FIG. 4b, a VM environment in an embodiment may comprise many other components, and many other operations may take place in such an embodiment.

The components of the VM environment in the embodiment depicted in FIG. 4b are the guest software 303, VM 302, VMM 312 with a physical memory management module 326, and platform hardware or physical machine 316. The platform hardware further comprises memory 320, including, in this embodiment, a set of EPT tables 328 and a VMCS 324; and a processor 318 with EPT access logic 322. In general a use of the EPT facilities in platform hardware may be initiated by guest software, as shown in FIG. 4 at 450, when an access to guest-physical memory is made, for instance by the guest software 303. Guest-physical memory accesses are referred to the VM abstraction of memory 451 provided by VM 302, which in turn is referred to the physical machine 316. If the EPT mechanism is enabled, the platform hardware 316 may process the VM reference to guest-physical memory using the EPT access logic 322 and the EPT tables 328 to translate an access to guest-physical memory to an access to host-physical memory 320. Details of EPT operation are discussed with reference to FIGS. 5 and 6 below The EPT mechanism itself may be configured by the VMM 312 which configures the EPT tables 328 and the EPT controls which may be stored in the VMCS 324. In this embodiment, the configuration of the EPT mechanism may be done by the VMM 312 as part of the operation of the physical memory management module 326 following the processing of a privileged event 405 in the VMM 312 and prior to VM entry 430. In configuring the EPT mechanism, the VMM 312 may update the EPT tables 328 and EPT controls, in order to enable, disable or otherwise control the EPT mechanism, 460.

Of course, many other forms of processing are possible for the use of extended paging tables in conjunction with a VM environment, for example, different locations for the EPT controls and EPT tables 328 as discussed earlier with reference to FIG. 3, multiple VMs, multiple processors, multiple threads, multiple guests, and combinations of these variations, among many others.

Figure 5:
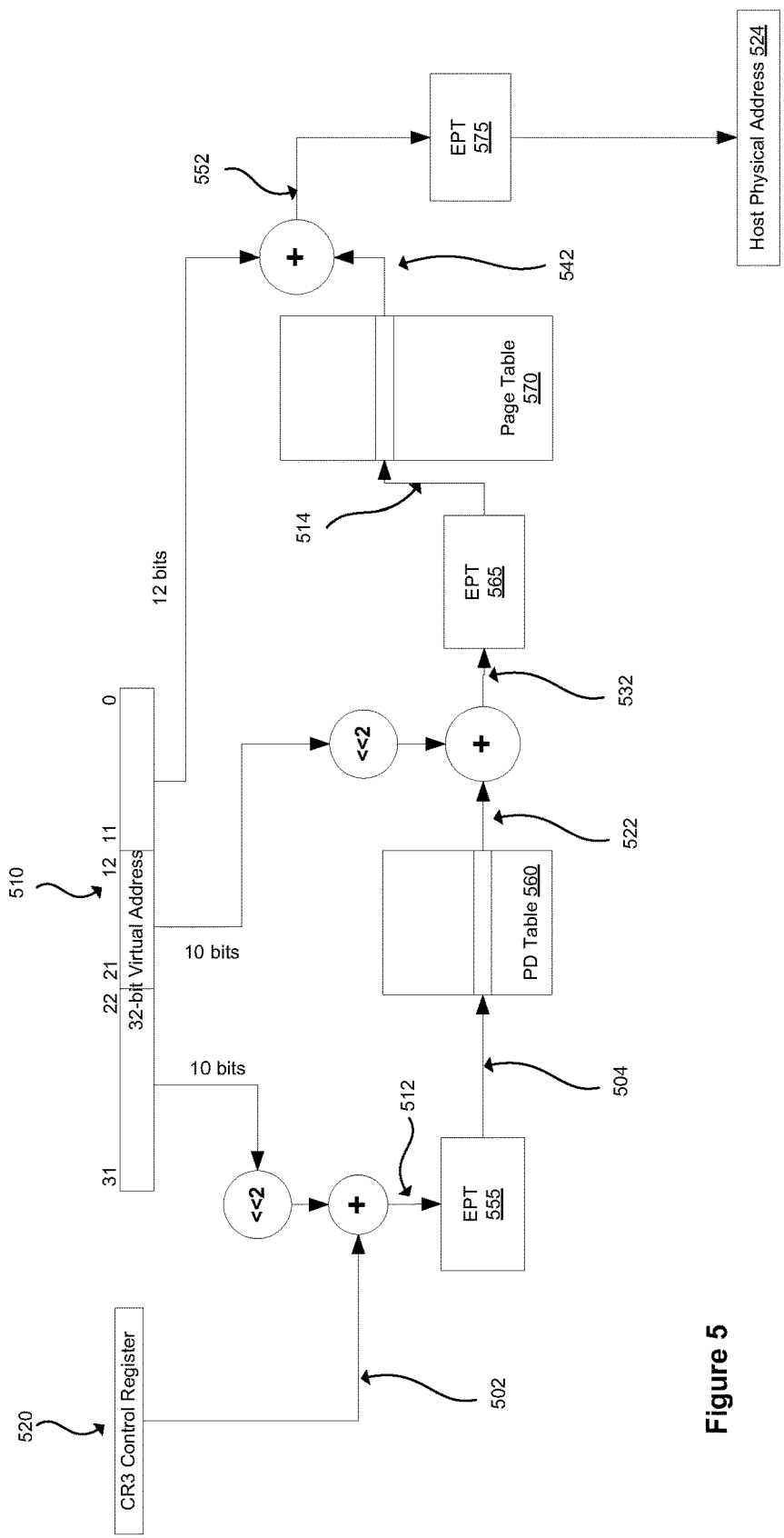
FIG. 5 depicts address computation using extended paging tables in one embodiment.

FIG. 5: FIG. 5 shows one example of processing using the extended page tables introduced above to ultimately compute a host-physical address when guest software in a virtual machine references a guest virtual address. The example depicted shows guest software running in an IA-32 platform using simple 32-bit virtual addressing and simple page table formats. One skilled in the art will easily be able to extend this example to understand, for example, other paging modes (e.g., 64-bit addressing in the guest software), other instruction set architectures (e.g., The Intel Itanium® Architecture, as specified, for example, in the Intel Itanium Architecture Software Developer's Manual, available from Intel Corporation) or other configurations.

In FIG. 5 a reference to a guest virtual address 510 is executed by guest software executing in a virtual machine. The memory management mechanism active in the guest (i.e., configured by the guest operating system) is used to translate the virtual address to a guest-physical address.

Each guest-physical address used in the translation, and the resulting guest-physical address, are translated to host-physical addresses through EPT before accessing the host-physical memory. This process is detailed in the following discussion.

In this example, the appropriate bits 502 in the CR3 register 520 point to the base of the guest's page directory table 560 in guest-physical memory. This value 502 is combined with the upper bits from the guest virtual address 510 (appropriately adjusted, according to IA-32 semantics by multiplying by 4 because, in this example, the entries in the tables are 4 bytes each) to form the guest-physical address 512 of the page directory entry (PDE) in the guest's PD table 560. This value 512 is translated through the EPT tables 555 to form the host-physical address 504 of the page directory entry. The processor accesses the page directory entry using this host-physical address 504.

Information from the PDE includes the base address 522 of the guest's page table 570. This guest-physical address 522 is combined with bits 21:12 of the guest virtual address 510 appropriately adjusted to form the guest-physical address 532 of the page table entry in the guest's page table 570. This guest-physical address 532 is translated through the EPT tables 565 to form the host-physical address 514 of the guest's page table entry (PTE). The processor accesses the PTE using this host-physical address 514.

Information from the PTE includes the base address 542 of the page in guest-physical memory being accessed. This value is combined with the low-order bits (11:0) of the guest virtual address 510 to form the guest-physical address 552 of the memory being accessed. This value 552 is translated through the EPT tables 575 to form the host-physical address 524 of the memory being accessed.

Each time the EPT tables are used to translate a guest-physical address to a host-physical address, the processor also validates that the access is permitted according to controls in the EPT tables, as will be described below. Additionally, it must be understood that the EPT tables 555, 565, and 575, though indicated as distinct in FIG. 5 may, in one embodiment, be the same set of EPT tables (i.e., a single set of EPT tables is used for all address translations from guest-physical to host-physical).

Figure 6:
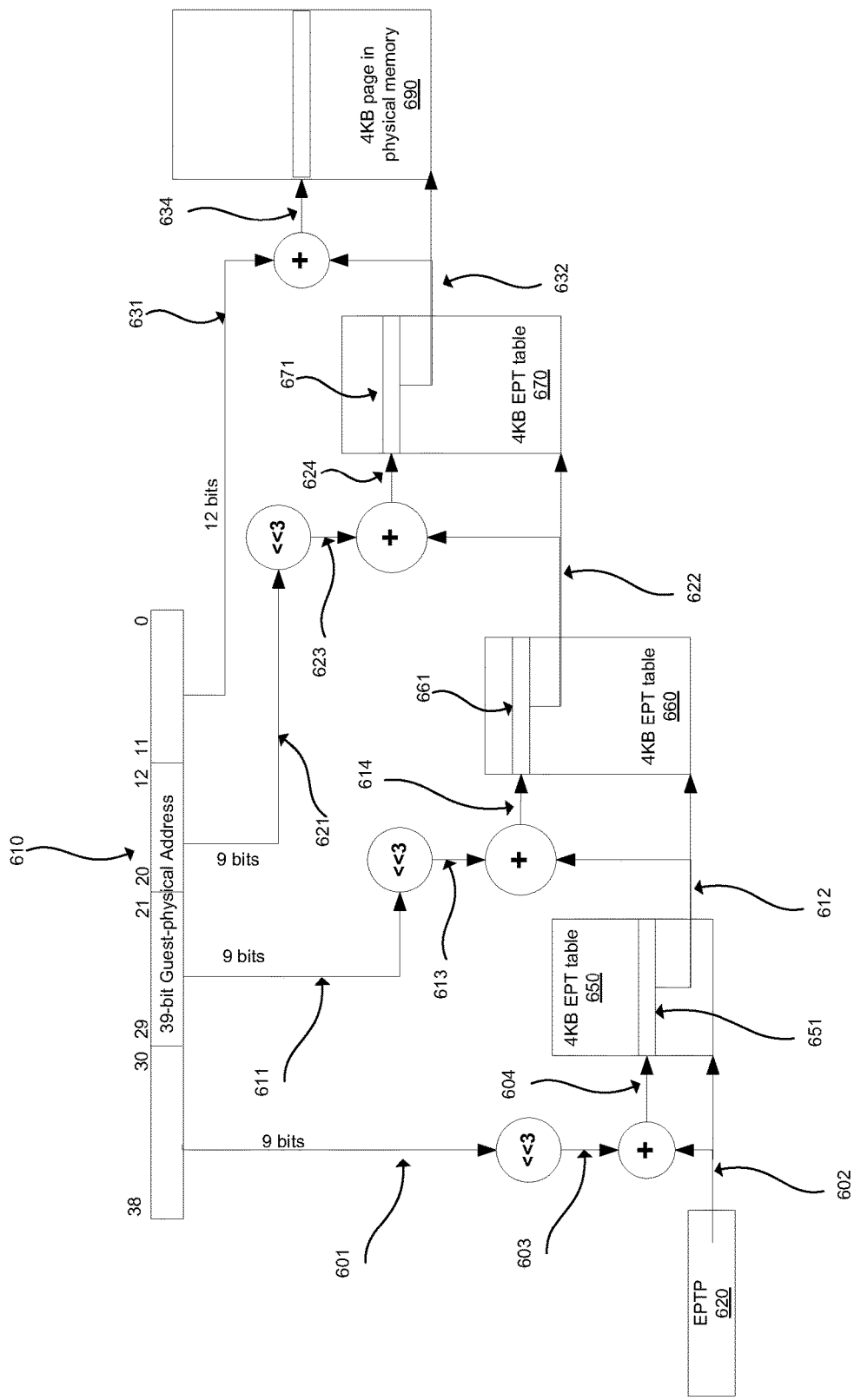
FIG. 6 depicts address computation using hierarchical extended paging tables in one embodiment.

FIG. 6: FIG. 6 depicts another example of processing using the extended page tables introduced above to ultimately translate a guest-physical address to a host-physical address using a multi-leveled EPT table. In the exemplary embodiment shown in FIG. 6, the appropriate bits 602 in the in an EPT base pointer (EPTP) 620 indicate the host-physical address of the base of the first-level EPT table 650, which in this embodiment is stored in host-physical memory. The EPTP will be discussed in more detail below with regard to FIG. 7. In this example, the entries in the EPT tables are 8 bytes each. Bits 38:30 from the guest-physical address 610 (601) are appropriately adjusted by multiplying by 8 (for example, by shifting the value left by 3 bits) to obtain an adjusted upper guest-physical address 603. The EPT table base address value 602 is combined with (added to) the adjusted upper guest-physical address bits 603, forming the host-physical address 604 of an EPT table entry 651 in a first level EPT table 650. An exemplary format of an entry such as 651 in the first level EPT table 650 as well as entries in the other EPT tables 660 and 670 will be discussed below with regard to FIG. 8.

Part of the EPT table entry 651 is the base address 612 of the next-level EPT table 660. A second adjusted address component 613 is formed from bits 29:21 (611) of the guest-physical address 610. This adjusted value 613 is combined with (added to) the base address 612 to form the host-physical address 614 of an EPT table entry 661 in the next level EPT table 660. The processor accesses the EPT table entry 661 using this host-physical address 614.

Information from the EPT table entry 661 includes the base address 622 of the final EPT table 670. This base address 622 is combined with adjusted bits 20:12 (623) of the guest virtual address 610 after appropriately adjusting to form the address 624 of the EPT table entry 671 in the final EPT table 670. The processor accesses the EPT table entry using this host-physical address 624.

Information from the EPT table entry 671 includes the base address 632 of the page being accessed in host-physical memory 690. This page address value 690 is combined with the low-order bits (11:0) of the guest-physical address 610 to form the final host-physical address 634 of the memory being accessed.

In the exemplary embodiment shown in FIG. 6, the EPT tables are hierarchical. They are similar in form to traditional multi-level page tables. Furthermore, in this example, each EPT table entry in each EPT table is 8 bytes in size, though in other embodiments this size may be different, changing the mechanics of accessing the tables as would be appreciated by one in the art. In this example, each EPT table is 4 KB in size. In other embodiments, different table sizes may be used; moreover, it is not required that all tables in a hierarchy like that depicted in FIG. 6 should be of the same size. This change in size may impact the number of bits used from the guest-physical address to index the next level of the EPT table. It will be obvious to one in the art that many other EPT table configurations are possible.

The hierarchical configuration depicted in the figure shows three levels of hierarchy, with two of the EPT tables 650 and 660 serving as indices to lower level EPT tables 660 and 670 respectively. In other embodiments, there may be fewer, e.g. two levels, or more e.g. four or more, levels of hierarchy in such a hierarchical table. In general the number of levels of hierarchy may vary depending at least in part on one or more of the number of bits in the guest-physical address, the size of each table, and the number of bytes in each table entry. The guest-physical address in the example in FIG. 6 is 32 bits in size. In other embodiments, the guest-physical address may be a different size; this change in size may require a change in the number of levels of EPT table that are required to perform a translation. For example, if the guest-physical address is 48 bits, 4 levels of EPT tables are required to do the translation (assuming 4 KB EPT tables at each level and 8-byte EPT table entries in each EPT table).

In the embodiment shown in FIG. 6, the EPT controls include a single field, the EPT pointer (EPTP). This field contains the address of the base of the first level EPT table. In this example, each EPT table is 4 KB is size.

Figure 7:
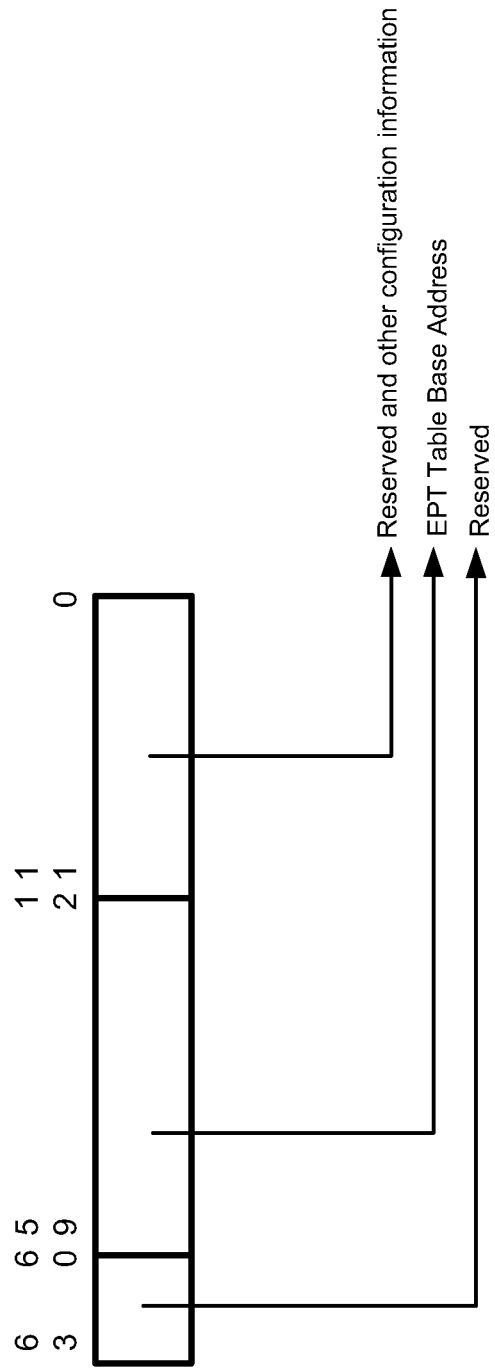
FIG. 7 depicts an extended paging table base address pointer in one embodiment.

FIG. 7: As shown in an exemplary embodiment depicted in FIG. 7, the EPT base address pointer (EPTP) includes bits used to form the base address (in host-physical memory) of the base of the first level EPT table such as that described above in FIG. 6. In the example depicted in FIG. 7, bits 59:12 form the base address. Bits 11:0 and 63:60 are assumed to be 0. Of course, the widths of the various bit fields may vary in other embodiments, for example the base address field will change depending on the number of address bits in a particular architecture or implementation. The remaining bits in the EPTP register may be used for other purposes in other embodiments. In one embodiment, the EPTP register is accessible only through a virtual machine entry or virtual machine exit. In such an embodiment, the EPTP register in the processor is loaded from an EPTP field in the VMCS at the time of a virtual machine entry, activating the EPT mechanism while the guest software operates. As indicated above, this activation (and loading of the EPTP field) may be controlled by other control bits within the VMCS or elsewhere.

Figure 8:
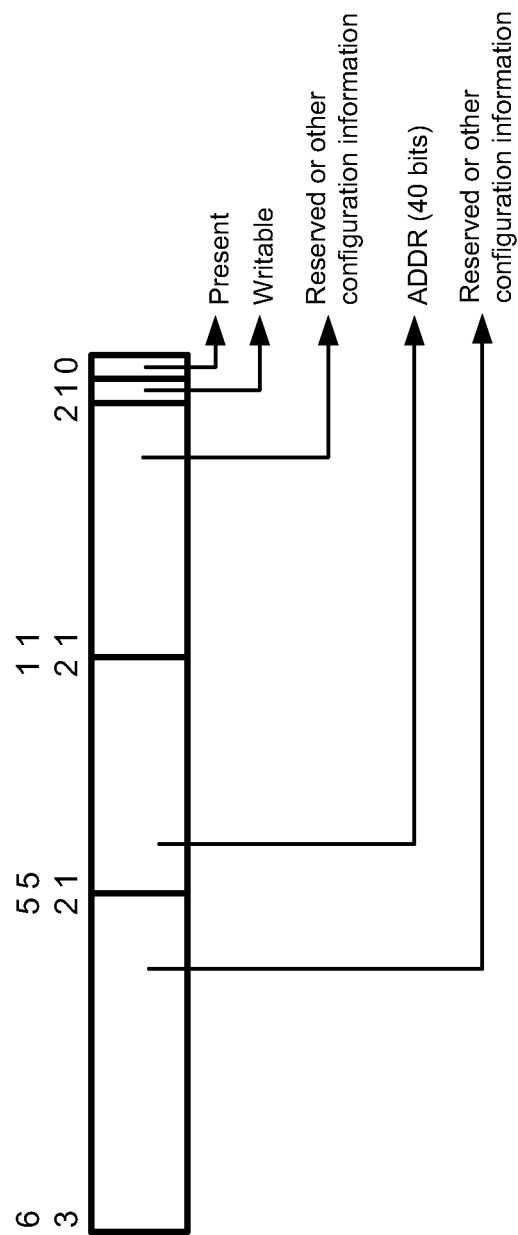
FIG. 8 depicts an extended paging table entry in one embodiment.

FIG. 8: This figure depicts an exemplary embodiment of the format of an entry in an EPT table. In this example, each entry in an EPT table is 8 bytes in size. In one embodiment, each EPT table is 4 KB in size, meaning that there are 512 EPT table entries per EPT table page. As shown in the example in FIG. 8, each EPT table entry contain the base host-physical address of the next level EPT table or page in memory (ADDR) and permission and other configuration information. As before, the widths of the various bit fields may vary in other embodiments, for example the ADDR width may change depending on the number of address bits in a particular architecture or implementation. FIG. 8 depicts only 2 permission bits, Present and Writable. In other embodiments, other permission and configuration information may be present in each EPT table entry. For example, in one embodiment, a permission bit indicates if a page of memory may be executed (i.e., if the contents of the page may be fetched and interpreted as instructions by the processor)

The EPT tables may be in a variety of different formats. For example, they may be implemented as shown in FIG. 6 as simple, hierarchical tables. Alternatively, they may be single level page tables (where the size of the first level EPT table dictates the maximum size of the guest-physical address space). Alternatively, they may be hashed tables in some form. It will be obvious to one skilled in the art that a myriad of possible configurations are possible in other embodiments.

The EPT tables may support one or more sizes of pages in host-physical memory. In one embodiment, each entry in each EPT table includes a super page bit which indicates that the walk of the EPT tables should stop at that point and the host-physical address formed using the address information in the EPT table entry and the remaining bits in the guest-physical address. In the example shown in FIG. 6, for example, if a super page bit was set in the EPT tables 660, the resulting page in host-physical memory would be 2 MB in size and the resulting host-physical address would be formed by combining bits 20:0 of the guest-physical address 610 with the address bits from the EPT table 660.

In some embodiments, the extended paging tables and EPT address translation mechanism may be enabled by virtual machine entry and disabled by virtual machine exit. Thus, as a consequence, the EPT mechanism may not be available for use by either guest software or VMM software to manage its own address translation. Furthermore, in such embodiments, the EPT mechanism may be distinct from and independent of other conventional memory page management mechanisms available to guest or host software, such as for example the IA-32 paging tables in an IA-32 embodiment, though EPT operations may utilize features of the conventional page management mechanism. Thus, the organization and operation of the EPT tables may be completely distinct from other page translation facilities provided by the processor for conventional execution of programs and operations directly on the host machine, as opposed to the execution of guest software that utilizes the virtualization and EPT mechanisms of the host machine. In one embodiment, the EPT mechanism may utilize tables in the same format as that used by a conventional page management mechanism of the embodiment, available to guest and VMM software. However, the tables controlling the EPT mechanism may still be distinct from those controlling either guest-virtual address to guest-physical address translation and from those controlling host-virtual address to host-physical address translation.

Although the examples provided may describe providing support for physical memory virtualization in a virtual machine system in the context of execution units and logic circuits, other embodiments can be accomplished by way of software. Some embodiments may be provided as a software program product or software which may include a machine or machine-readable medium having stored thereon instructions which when accessed by the machine perform a process of the embodiment. In other embodiments, processes might be performed by specific hardware components that contain hardwired logic for performing the processes, or by any combination of programmed components and custom hardware components.

In the preceding description, for purposes of explanation, numerous specific details are set forth in order to provide a thorough understanding of the described embodiments, however, one skilled in the art will appreciate that many other embodiments may be practiced without these specific details.

Some portions of the detailed description above is presented in terms of algorithms and symbolic representations of operations on data bits within a processor-based system. These algorithmic descriptions and representations are the means used by those skilled in the art to most effectively convey the substance of their work to others in the art. The operations are those requiring physical manipulations of physical quantities. These quantities may take the form of electrical, magnetic, optical or other physical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the description, terms such as "executing" or "processing" or "computing" or "calculating" or "determining" or the like, may refer to the action and processes of a processor-based system, or similar electronic computing device, that manipulates and transforms data represented as physical quantities within the processor-based system's storage into other data similarly represented or other such information storage, transmission or display devices.

In the description of the embodiments, reference may be made to accompanying drawings. In the drawings, like numerals describe substantially similar components throughout the several views. Other embodiments may be utilized and structural, logical, and electrical changes may be made. Moreover, it is to be understood that the various embodiments, although different, are not necessarily mutually exclusive. For example, a particular feature, structure, or characteristic described in one embodiment may be included within other embodiments.

Further, a design of an embodiment that is implemented in a processor may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) that constitute or represent an embodiment.

Embodiments may be provided as a program product that may include a machine-readable medium having stored thereon data which when accessed by a machine may cause the machine to perform a process according to the claimed subject matter. The machine-readable medium may include, but is not limited to, floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions. Moreover, embodiments may also be downloaded as a program product, wherein the program may be transferred from a remote data source to a requesting device by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the claimed subject matter but to illustrate it. The scope of the claimed subject matter is not to be determined by the specific examples provided above but only by the claims below.

What is claimed is:
1. A processor, comprising:
memory management hardware to translate a guest-virtual address, the memory management hardware including:
   extended page table (EPT) access logic to access an EPT hierarchy while guest software operates on the processor, the EPT hierarchy including
      a first table input, the first table input coupled downstream from a first node, the first node to receive a first segment of a guest-physical address;
      a first table output, the first table output to provide a base host-physical address for a second table;
      a second table input, the second table input coupled downstream from a second node, the second node to receive a second segment of the guest-physical address, the second segment contiguous with and of lower order than the first segment;
      a second table output, the second table output to provide a base host-physical address for a third table;
      a third table input, the third table input coupled downstream from a third node, the third node to receive a third segment of the guest-physical address, the third segment contiguous with and of lower order than the second segment;
      a third table output, the third table output to provide a base host-physical address for a physical page;
      a fourth node to present an input for the physical page, the fourth node to present the input for the physical page coupled downstream from a fifth node, the fifth node to receive a fourth segment of the guest-physical address, the fourth segment contiguous with and of lower order than the third segment; and
      a register to store a base host-physical address of a highest-level table of the EPT hierarchy;
   wherein the EPT hierarchy is to translate each of a plurality of guest-physical addresses to one of a plurality of host-physical addresses, each of the plurality of guest-physical addresses to be formed by the memory management hardware based on one of a plurality of portions of the guest-virtual address, wherein for each translation the processor is to validate access permission according to controls in EPT tables, and wherein the register is to be loaded from a field in a virtual machine control structure in connection with a virtual machine entry.

* * * * *